United States Patent [19]
Drexler et al.

[11] 3,768,002
[45] Oct. 23, 1973

[54] GENERATOR EXCITATION SYSTEM WITH ROTATING ELECTROMAGNETIC ENERGY CONNECTOR AND INTERNAL WINDING POWER SOURCE

[75] Inventors: Karl F. Drexler, Burnt Hills; Robert L. Winchester, Schenectady, both of N.Y.

[73] Assignee: General Electric Company, Schenectady, N.Y.

[22] Filed: Oct. 1, 1971

[21] Appl. No.: 185,671

[52] U.S. Cl. .................................... 322/25, 322/90
[51] Int. Cl. ............................................... H02p 9/32
[58] Field of Search .................. 322/25, 27, 28, 59, 322/75, 90; 310/68 D, 140, 144, 198

[56] References Cited
UNITED STATES PATENTS

| | | | |
|---|---|---|---|
| 2,913,656 | 11/1959 | Bliss | 322/25 |
| 3,479,543 | 11/1969 | Drexler | 310/162 |
| 3,522,520 | 8/1970 | Goldman | 322/28 |
| 3,371,235 | 2/1968 | Hoover | 322/25 X |
| 3,492,555 | 1/1970 | Shibata | 318/181 X |

*Primary Examiner*—James D. Trammell
*Attorney*—William C. Crutcher et al.

[57] ABSTRACT

A static excitation system for self-excitation of a large generator with an electromagnetic energy converter having a rotating secondary winding supplying power through rotating rectifiers to the generator field. An AC regulated power source for the primary winding of the electromagnetic energy converter is supplied from internal windings in the generator stator having current-responsive and potential-responsive characteristics to provide a "compounded" power source. The potential-responsive winding is preferably located in the main winding slots to link the main synchronous flux of the generator field, while the current-responsive winding links with flux produced by the generator main armature winding.

6 Claims, 2 Drawing Figures

PATENTED OCT 23 1973 3,768,002
FIG.1
FIG.2
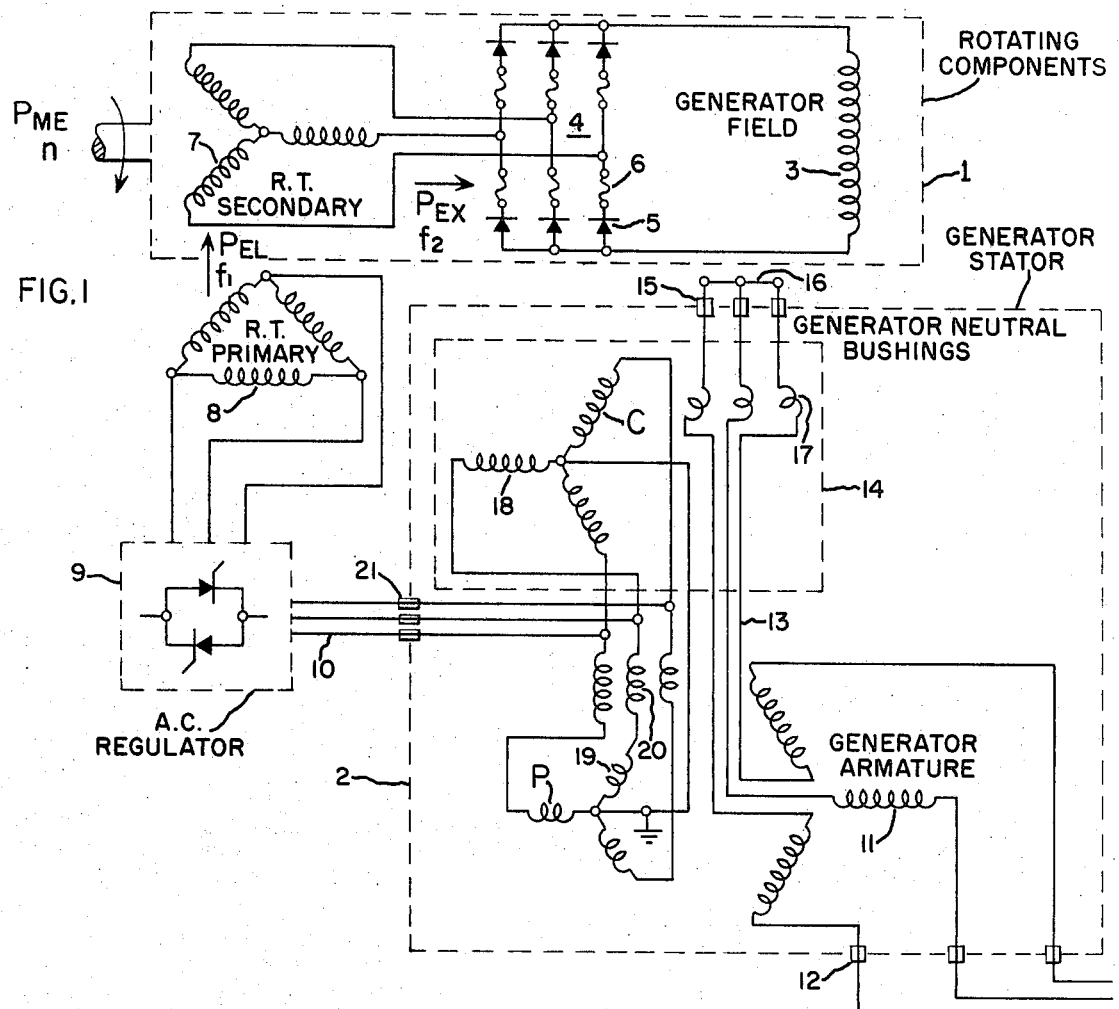
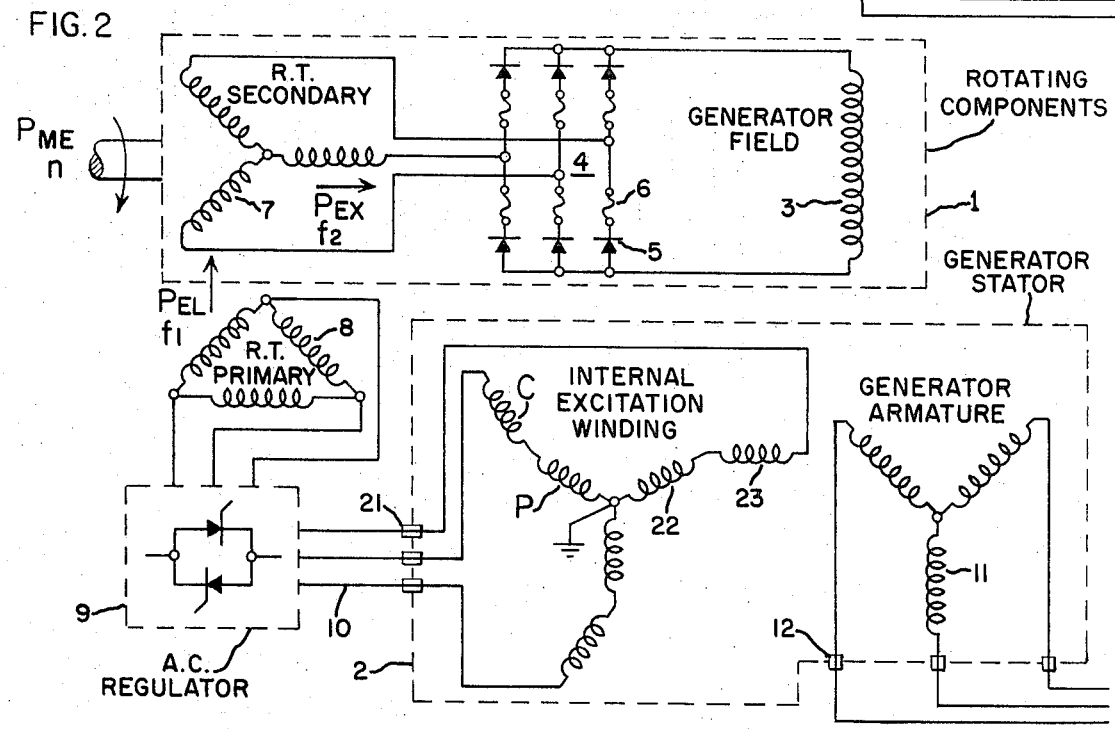

3,768,002

GENERATOR EXCITATION SYSTEM WITH ROTATING ELECTROMAGNETIC ENERGY CONNECTOR AND INTERNAL WINDING POWER SOURCE

BACKGROUND OF THE INVENTION

This invention relates generally to static excitation systems for large dynamoelectric machines, and more particularly to self-excited dynamoelectric machines with a compounded excitation power source for the field windings.

Excitation systems for very large dynamoelectric machines such as turbine-generators have grown in complexity and rating along with the ratings of the generators themselves. Early excitation systems included rotating power sources such as a separate DC generator driven by the turbine generator shaft which supplied field excitation through slip rings and brushes to the rotating field winding. Another approach employs an AC exciter driven by the turbine generator with rectification and control of the excitation voltage in external stationary rectifier banks. Still another approach involves the use of rotating diode rectifiers on the rotor supplied by a rotating alternator armature. However in the event that fast response is required, thyristors must be used instead of diodes. This involves increasing the number of rectifiers because of the limited capacity of thyristors as compared to diodes. For control of the thyristors, it is then necessary to transmit a multitude of control and monitoring signals from the stationary to the rotating component. In the foregoing arrangements, the total rectification power source rotates, with control effected through electromagnetic flux linkages with the rotating components.

A separate category of excitation systems are so-called "static" excitation systems when the excitation power source is not rotating, but is stationary or static. The most commonly known static systems take excitation power from the generator external main output lines or busses, by means of potential transformers or current transformers or a combination of these. In some cases, power is obtained by tapping the main generator armature winding and combining this source with external transformers. Compounded excitation power sources can be obtained by judicious combining of potential-responsive and current-responsive components. Other types of static excitations systems using separate internal windings linking with flux produced by the generator rotor field winding and by the generator armature winding have been proposed, as more fully described in U.S. Pat. No. 3,479,543 issued to K. F. Drexler on Nov. 18, 1969 and in co-pending applications Ser. No. 155,511 in the names of K. F. Drexler and H. W. Kudlacik and Ser. No. 155,512 in the names of H. W. Kudlacik and D. M. Willyoung, both filed June 22, 1971 and assigned to the present assignee.

An intermediate type of excitation system has been proposed which lies between the aforedescribed systems, in that a portion of the excitation power source is derived directly through rotation of the shaft and a portion is derived from the generator electrical output. This is accomplished through an electromagnetic energy converter similar to a rotating transformer with a stationary primary winding and a secondary winding which rotates along with the field, except that the winding is arranged so that the AC frequency of the secondary winding is influenced by the speed of rotation.

The basic rotating electromagnetic energy converter arrangement is disclosed in U.S. Pat. No. 2,414,287 to F. E. Crever, assigned to the present assignee; other variations are disclosed in U.S. Pat. Nos. 3,210,644-Sparrow and 3,492,555-Shibata. The foregoing systems all obtain power for the energy converter primary winding either from connections to the external generator leads or from taps on the main winding. This requires either breaking into the main armature winding or into the external high voltage busses, causing many complications and undesirable interruptions in the insulation integrity of very large dynamo machines. This shortcoming has slowed adoption of the energy converter concept despite the fact that the system provides "power amplification" and requires only a fraction of the total excitation power to be obtained from the generator power lines.

Accordingly, one object of the present invention is to provide an improved excitation system using an electromagnetic energy converter which obviates the need for tapping the main armature winding or breaking into the high voltage external busses to obtain the static component of the excitation power.

Another object is to provide an improved excitation system which gives the fast response and other characteristics of a rotating thyristor system but using rotating diodes and stationary thyristors.

Another object of the invention is to provide an improved excitation system with a compounded power source from internal generator windings which require only a fraction of the power required from previously suggested internal excitation systems.

SUMMARY OF THE INVENTION

Briefly stated, the invention comprises an excitation system with a rotating electromagnetic energy converter secondary winding disposed on the shaft to supply power through rotating rectifiers to the field winding. The primary of the converter is supplied with regulated AC power obtained from internal windings in the generator stator. The internal windings are arranged to supply current-responsive and voltage-responsive components by flux linkages with the synchronous rotor field and with the main armature winding.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified schematic diagram of an excitation system with an energy converter supplied by internal excitation windings employing an internal transformer, and FIG. 2 is a modification wherein the internal excitation windings supply power directly without an internal transformer.

DESCRIPTION OF THE PREFERRED EMBODIMENT

Referring now to FIG. 1 of the drawing, the rotating components of the system are indicated within block 1 and the generator stator casing enclosure is indicated within block 2, it being understood that the generator field portion in block 1 actually would be physically disposed within the stator. The rotating components comprise a conventional generator field winding 3 supplied with rectified DC power through a rotating rectifier bridge arrangement 4. The rectifier bridge includes diodes 5 and fuses 6, it being understood that each represented diode 5 might be a bank of parallel-connected diodes.

The secondary winding 7 of the rotating transformer is a three-phase winding preferably wound to provide a multiple of the number of pole-pairs on the generator field winding 3, a suitable number being 8 poles in the case of a 2-pole field winding.

A three-phase delta-connected primary winding 8 is disposed to provide flux linkage with rotating secondary winding 7. This is accomplished by making windings 7 and 8 the rotating and stationary elements respectively of a known type of synchronous device with laminated rotating and stationary cores and wound so that the frequency ratio is dependent upon rotational speed. A conventional AC voltage regulator 9 serves to regulate the power source supplied through leads 10.

The above description comprises the known elements of an electromagnetic energy converter excitation system. Turning now to the internal winding power source, a conventional three-phase main armature winding 11 for the generator has its high voltage leads brought out of the generator casing through bushings 12 to the high voltage AC bus. Neutral leads 13 from the main armature winding pass through the core of an internal transformer, indicated generally at 14, before leaving the generator casing through bushings 15 to make an external neutral connection 16.

Neutral leads 13 form an internal primary winding 17 which can conveniently be a single turn primary because of the very large current. Primary 17 links with a secondary winding 18 disposed on a suitable core. Winding 18 forms the current-responsive portion of the internal winding designated the C-winding.

Connected in parallel with the high voltage leads of C-winding 18 is a second circuit which includes a potential-responsive or P-winding 19. P-winding 19, which may be arranged and fluid-cooled as more fully disclosed in the aforementioned application Ser. No. 155,512 to Kudlacik et al., preferably comprises three single phase-displaced conductors located contiguous to the air gap of the generator, so that the winding links with the rotating synchronous flux produced by the generator field winding 3. This is preferably accomplished by locating the P-winding in the top of the slot above the conventional main winding, preferably incorporated into the slot wedge that holds the main winding in place. A reactor coil 20 is connected in series with each phase of the P-winding to limit current flow and to provide the proper impedance match of the P-winding circuit with the C-winding. The output leads from the parallel-connected C-winding and P-winding are led from the generator stator through suitable bushings 21 to furnish the AC power source to the regulator 9.

A modified form of the invention is shown in FIG. 2 wherein identical elements to those in FIG. 1 have the same reference numerals. The generator armature winding 11 is conventional, with the neutral connection made in normal manner, either internally or externally. A three-phase Y-connected P-winding 22 is arranged as in FIG. 1 contiguous to the air gap so as to be responsive to the rotating synchronous flux from the field winding 3. However, in FIG. 2, rather than employing an internal transformer, the current-responsive or C-winding is located so as to link directly with flux produced by current flowing through the main armature winding 11. This may be accomplished by placing opposite sides of a coil in the bottom and top respectively of a conventional armature slot so as to link with the armature cross-slot leakage flux as more particularly described in the aforementioned Drexler U.S. Pat. No. 3,479,543. Alternatively by disposing the C-winding 23 internally in the end turn or connection ring region of the stator to link with the flux produced by the current flowing in the main armature winding end turns.

Each phase of the P-winding and C-winding is connected in series as indicated, but the P and C components in each series connected branch are shown out of phase to indicate compounding. If desired, both the P-winding and C-winding for a given phase can be incorporated in a single coil which comprises a conductor extending along the top of one slot above the main winding in the armature core and returning along the bottom of a closely adjacent slot as shown in FIG. 16 of the aforementioned Drexler patent, which is incorporated herein by reference.

OPERATION OF THE INVENTION

As is known, the rotating synchronous device serves as an electromagnetic energy converter to provide excitation power $P_{EX}$ to rectifier bank 4 at frequency $f_2$.

The frequency $f_2$ is dependent not only upon the frequency $f_1$ of primary winding 8, but also upon the speed of rotation $n$ of the shaft. When stator winding 7 is rotated in the proper direction and the number of poles and winding ratios are properly selected, only a small fraction of the required excitation power $P_{EX}$, indicated herein as electrical power $P_{EL}$, is furnished from the primary winding 8. The balance of the required excitation power $P_{EX}$ comes from the mechanical power $P_{ME}$ required by the prime mover or turbine to turn the secondary 7 against the reaction of the primary 8. Thus a power amplification is achieved following the relationships;

$$P_{EX} = P_{EL} + P_{ME}$$

$$P_{EX} = f_2/f_1 \times P_{EL}$$

For example, in an excitation system requiring 2500 KW at 500 volts to rectifier bank 4, with a two-pole generator field turning at 3600 rpm; and winding 7 being wound for 8 poles, the required electrical power $P_{EL}$ is only 500 KW. Since the required electrical power $P_{EL}$ is only a fraction of the total excitation power $P_{EX}$ the internal C-winding 18 and P-winding 19 of FIG. 1 or corresponding windings 22, 23 of FIG. 2 can supply this power from relatively small windings. The P-winding links with the generator synchronous flux and therefore produces a voltage responsive to the voltage induced in the generator main armature winding. The C-winding links either with the main armature leads via a transformer in FIG. 1 or links with the main armature cross slot leakage flux in FIG. 2. This produces a component which is responsive to armature current varying with load, thereby giving a total compounding effect which produces desirable regulating characteristics. The system is inherently self-regulating with fast response and does not require connections into the main armature insulation or high voltage external bus.

While there has been described what is herein considered to be the preferred embodiment of the invention, other modifications will occur to those skilled in the art and it is desired to cover in the appended claims all such modifications as fall within the true spirit and scope of the invention.

What is claimed is:

1. An excitation system for a dynamoelectric machine having a rotating field winding and electromagnetic stator core with a multi-phase set of main armature windings comprising:

an electromagnetic energy converter having a secondary winding adpated to rotate with said field winding and also having a stationary primary winding, said secondary winding being wound to provide a multiple of the number of pole-pairs on the field winding, rotating rectifier means adapted to receive AC excitation power from said secondary winding and connected to supply rectified DC excitation power to said field winding, a multi-phase internal winding disposed in close proximity with said electromagnetic stator core and having a first winding portion adapted to link with the synchronous flux produced by said field winding to provide a potential-responsive power source and a second winding portion adapted to link with the flux produced by said main armature winding so as to provide a current-responsive power source, and AC regulator means connected to receive power from said first and second portions of said internal winding and furnishing a regulated compound power source to said energy converter primary.

2. The combination according to claim 1, wherein said first winding portion comprises a plurality of conductors disposed contiguous to the air gap of said dynamoelectric machine.

3. The combination according to claim 2, wherein said second winding portion comprises a plurality of coils disposed adjacent said main armature winding and arranged to link with the cross-slot leakage flux of said main winding, each phase of the first and second windings being connected in series.

4. The combination according to claim 2, wherein each phase of said first winding portion has a reactor coil connected in series therewith, wherein said second winding portion is disposed on the core of an internal transformer arranged to provide flux linkage with the internal leads from said main armature winding, said each phase of first and second winding portions being connected in parallel.

5. The combination according to claim 1, wherein said AC regulator means is a stationary thyristor-controlled device, whereby said excitation system has fast response.

6. An excitation system for a dynamoelectric machine having a rotating field winding and electromagnetic stator core with a multiphase set of main armature windings thereon, comprising:

a rotating transformer having a secondary winding disposed to rotate with the generator rotor and having a number of pole-pairs which are a multiple of those in the field winding and having a stationary primary winding adapted to provide flux linkage with said secondary winding, rectifier means connected to receive AC excitation power from said rotating secondary winding and connected to supply DC excitation power to said field winding, an excitation transformer internal to said dynamoelectric machine having a primary winding comprised of the internal leads from said main generator armature winding, an internal multi-phase winding each phase having a first circuit comprising a first winding portion disposed contiguous to the air gap to link with the rotating synchronous flux from said generator field winding and being connected in series with a reactor coil, and a second circuit comprising a second winding portion disposed on said internal transformer and linking with a phase lead of the dynamoelectric machine armature winding, said first and second circuit being connected in parallel for each phase, and AC regulator means connected to receive power from said internal winding phases and supply regulated power to the rotating transformer primary.

* * * * *